(12) United States Patent
Lacombe et al.

(10) Patent No.: US 8,156,509 B2
(45) Date of Patent: Apr. 10, 2012

(54) EXCHANGING DATA USING DATA TRANSFORMATION

(75) Inventors: Jason Nathaniel Lacombe, San Francisco, CA (US); Adriana M. Loghin, Boca Raton, FL (US); Travis Eli Nelson, Campbell, CA (US); Venkat Arun Reddy, Hyderabad (IN); Suraksha Vidyarthi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1263 days.

(21) Appl. No.: 11/758,240

(22) Filed: Jun. 5, 2007

(65) Prior Publication Data

US 2008/0307432 A1    Dec. 11, 2008

(51) Int. Cl.
*G06F 9/44* (2006.01)

(52) U.S. Cl. ......................... 719/331; 719/332

(58) Field of Classification Search .................. 719/310, 719/331, 332
See application file for complete search history.

(56) References Cited

U.S. PATENT DOCUMENTS

| | | | |
|---|---|---|---|
| 6,920,455 B1 | 7/2005 | Weschler | |
| 7,426,734 B2 * | 9/2008 | Debique et al. | 719/310 |
| 7,680,828 B2 * | 3/2010 | Gorelik | 707/763 |
| 2002/0156814 A1 | 10/2002 | Ho | |
| 2003/0024975 A1 * | 2/2003 | Rajasekharan | 235/375 |
| 2004/0054690 A1 | 3/2004 | Hillerbrand et al. | |
| 2004/0243932 A1 | 12/2004 | Bender et al. | |
| 2005/0091576 A1 * | 4/2005 | Relyea et al. | 715/502 |
| 2005/0165888 A1 * | 7/2005 | Elliott | 709/203 |
| 2005/0257139 A1 | 11/2005 | Burst et al. | |
| 2006/0150172 A1 | 7/2006 | Heath et al. | |
| 2006/0195783 A1 | 8/2006 | Davis et al. | |
| 2006/0242196 A1 * | 10/2006 | Tsyganskiy et al. | 707/103 Y |

\* cited by examiner

*Primary Examiner* — Van Nguyen
(74) *Attorney, Agent, or Firm* — Yee & Associates, P.C.; Prentiss W. Johnson

(57) ABSTRACT

A computer implemented method, apparatus, and computer-usable program product for exchanging data using data transformation are provided. A first data binding component receives data from a function selector. A set of data bindings capable of invocation by the first data binding component is available. The function selector determines a content type associated with the data. The first data binding component receives the data and the content type from the function selector. The first data binding component invokes a data binding corresponding to the content type from the set of data bindings to transform the data into a data object. The data object has an object name. A target application is determined based on the object name, and the data object is then routed to a target application.

18 Claims, 6 Drawing Sheets

EXCHANGING DATA USING DATA TRANSFORMATION

BACKGROUND OF THE INVENTION

1. Field of the Invention

The present invention relates generally to an improved data processing system, and in particular, to a computer implemented method and apparatus for data transforming data. Still more particularly, the present invention relates to a computer implemented method, apparatus, and computer-usable program code for exchanging data using data transformations.

2. Description of the Related Art

Software applications are used for a variety of purposes. Software applications used for managing and manipulating data related to a business enterprise are called enterprise information systems (EIS).

Enterprise information systems exchange data with other software applications, other enterprise information systems, interact with personnel, and connect with other enterprise information systems. In performing these functions, enterprise information systems use a variety of methods for connecting to other software applications and devices. One example of these methods involves calling a function of one software application from within another software application. This method is called remote procedure call (RPC).

Another example of the methods used for connecting one software application to another is by using an application programming interface (API). Yet another method for connecting software applications with one another to exchange data is by exchanging structured documents. Structured documents are electronic documents containing data organized in a pre-defined structure. Extensible markup language (XML) is an example of a structured document format.

Enterprise information systems can be connected to other enterprise information systems, software applications, and devices. This interconnectivity is useful for exchanging data amongst the various connected software systems. In enabling interconnectivity in this manner, some processing of the data is performed during the exchange of the data.

The processing performed during the data exchange is typically encapsulated in a specialized piece of program code called an adapter. An adapter is a software application that can process the data according to the encapsulated program code.

An adapter can utilize any one of several methods of communication available for connecting with the enterprise information system. For example, an adapter may use remote procedure call to interact with an enterprise information system. Another adapter may use an application programming interface for interacting with the enterprise information system. Yet another adapter may be programmed to interact with an enterprise information system by exchanging a structured document.

SUMMARY OF THE INVENTION

The illustrative embodiments provide a computer implemented method, apparatus, and computer-usable program product for exchanging data using data transformation. A function selector is available. A first data binding component capable of receiving data from the function selector is available. A set of data bindings capable of invocation by the first data binding component is available. The function selector determines a content type associated with the data. The first data binding component receives the data and the content type from the function selector. The first data binding component invokes a data binding corresponding to the content type from the set of data bindings to transform the data into a data object. The data object has an object name.

A target application is determined based on the object name. The data object is then routed to a target application.

The function selector can determine the content type associated with the data by transforming the data into a generic data object and discovering the content type from the generic data object. For transforming the data into a generic data object, the functions selector invokes the generic data binding component and the generic data binding component transforms the data into a generic data object.

Alternatively, if a content type is not associated with the data, the function selector can transform the data into a generic data object, and the first data binding component can set the object name to be a generic object name. When the first data binding component receives a generic data object from the function selector, the first data binding component omits invoking a data binding from the set of data bindings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
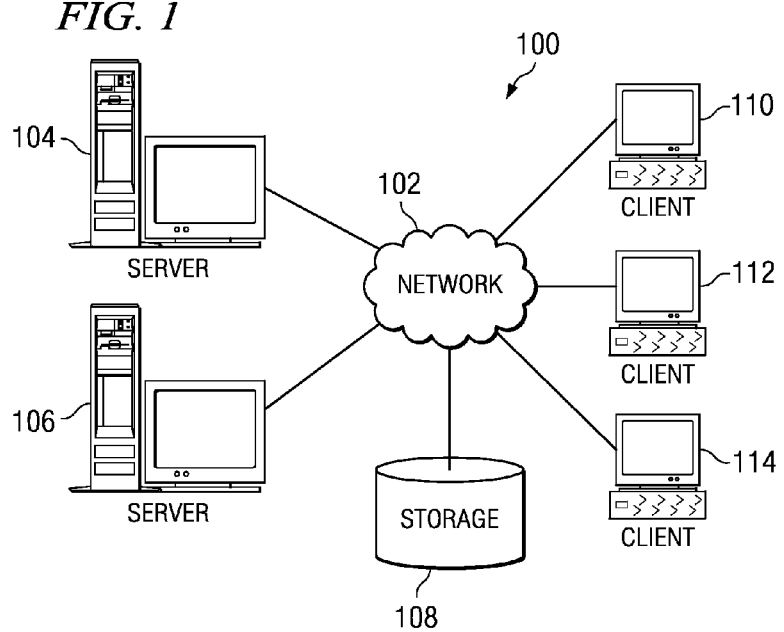
FIG. 1 depicts a pictorial representation of a network of data processing systems in which illustrative embodiments may be implemented.
Figure 2:
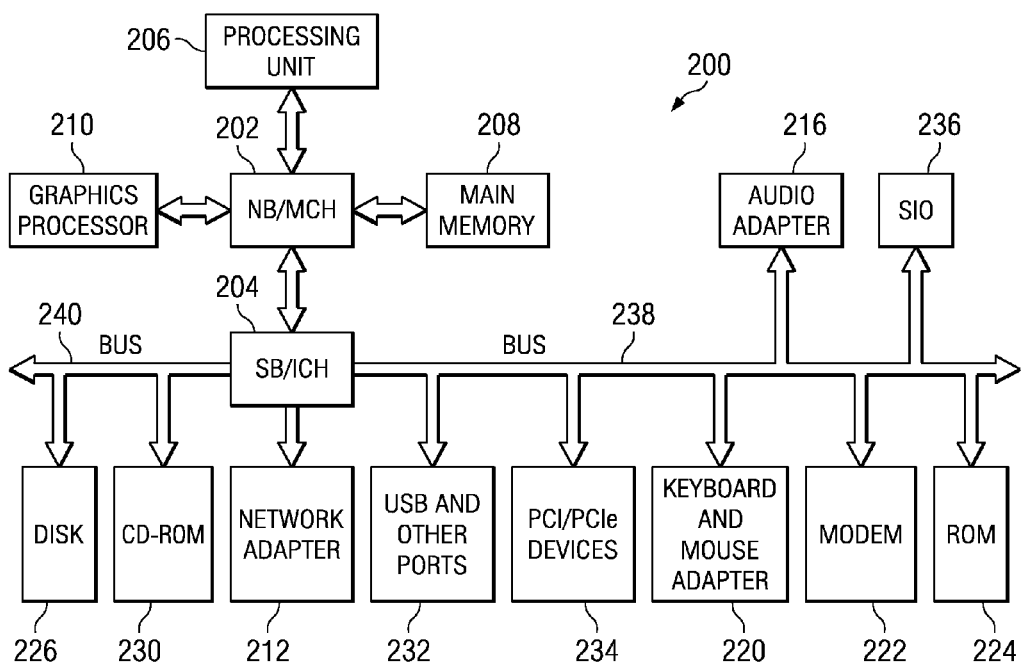
FIG. 2 depicts a block diagram of a data processing system in which illustrative embodiments may be implemented.

With reference now to the figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub (SB/ICH) 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. (Java™ and all Java™ based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments recognize that data stored in an enterprise information system may be organized differently from the requirements of a target application. A target application is a software application, other enterprise information system, or a device that connects with an enterprise information system for exchanging data. Connecting an enterprise information system with a target application is called integration.

For example, an enterprise information system may store data in the form of data objects defined for that enterprise information system, whereas a target application may want the data in a structured document form. A data object is a data structure of a certain specification, with or without associated functions included within the data structure.

As another example, an enterprise information system may store data in the form of data objects defined for that enterprise information system, whereas a target application may want the data in the form of another data object defined specifically for that target application. Similarly, a target application may supply data in one form, whereas the enterprise information system may want the data in another form. As illustrated by these examples, the data that is being exchanged amongst two systems may be organized differently at the source and the destination of the data. Thus, the data has to be transformed during the exchange.

The program code encapsulated in an adapter performs the transformation of data that flows through the adapter. Presently, specific adapters are constructed for specific data exchanges. Such adapters provide the necessary logic for transforming a specific form of data to a specific other form of that data.

Data in an enterprise information system-target application integration can pertain to any matter relevant to the integration. For example, specific forms of data can reflect a business transaction being transacted via the integration, such as a purchase order. Consequently, a data object may be created to include the data of the purchase order in an enterprise information system. A corresponding XML document may also be created to include the data of the purchase order in a target application. As can be seen, to communicate a purchase order from an enterprise information system to a target application, or vice versa, the purchase order data has to be transformed from one form to another.

In the manner illustrated in the above example, other data objects can also be created. Typically, data objects are identified by unique names that uniquely identify the data object. Such a name is called an object name. An object name may include the name of the transaction, the name of the system to which the data object pertains, other identifiers, and combinations thereof. Similarly, a structured document can also have an object name.

An identifier known as content type is also used to identify data, data objects, and structured data. Content type is a classification or type of the contents of a data structure. For example, a content type of an XML structured document can be "text/xml". Using this content type, a system can determine that the data is in text form and has an XML structure. However, the system may or may not be able to determine from a given content type the exact structure of the data associated with the content type.

The illustrative embodiments recognize that creating adapters for each integration is time consuming, effort intensive, and error prone. The illustrative embodiments further recognize that such adapters are also rather rigid in nature, requiring programmatic changes if the form of a source or destination data should change.

Furthermore, the illustrative embodiments recognize that new code may have to be written for new forms of data, such as new or changed data objects, object names, and content type, on either side of the integration.

Therefore, a method and apparatus for exchanging data using data transformation that solves these problems is useful. Illustrative embodiments described below provide a method and apparatus for determining a data transformation that should be performed on the data from a given source, to reach a given destination. The illustrative embodiments further provide that the data transformation may be performed in several stages depending on the nature of the data from the source. The illustrative embodiments provide a way in which new data transformation can be introduced for transforming new forms of data, new sources of data, new destinations of transformed data, and combinations thereof. In accordance with the illustrative embodiments, the new data transformations can continue to utilize the data transformation infrastructure provided in the illustrative embodiments.

Figure 3:
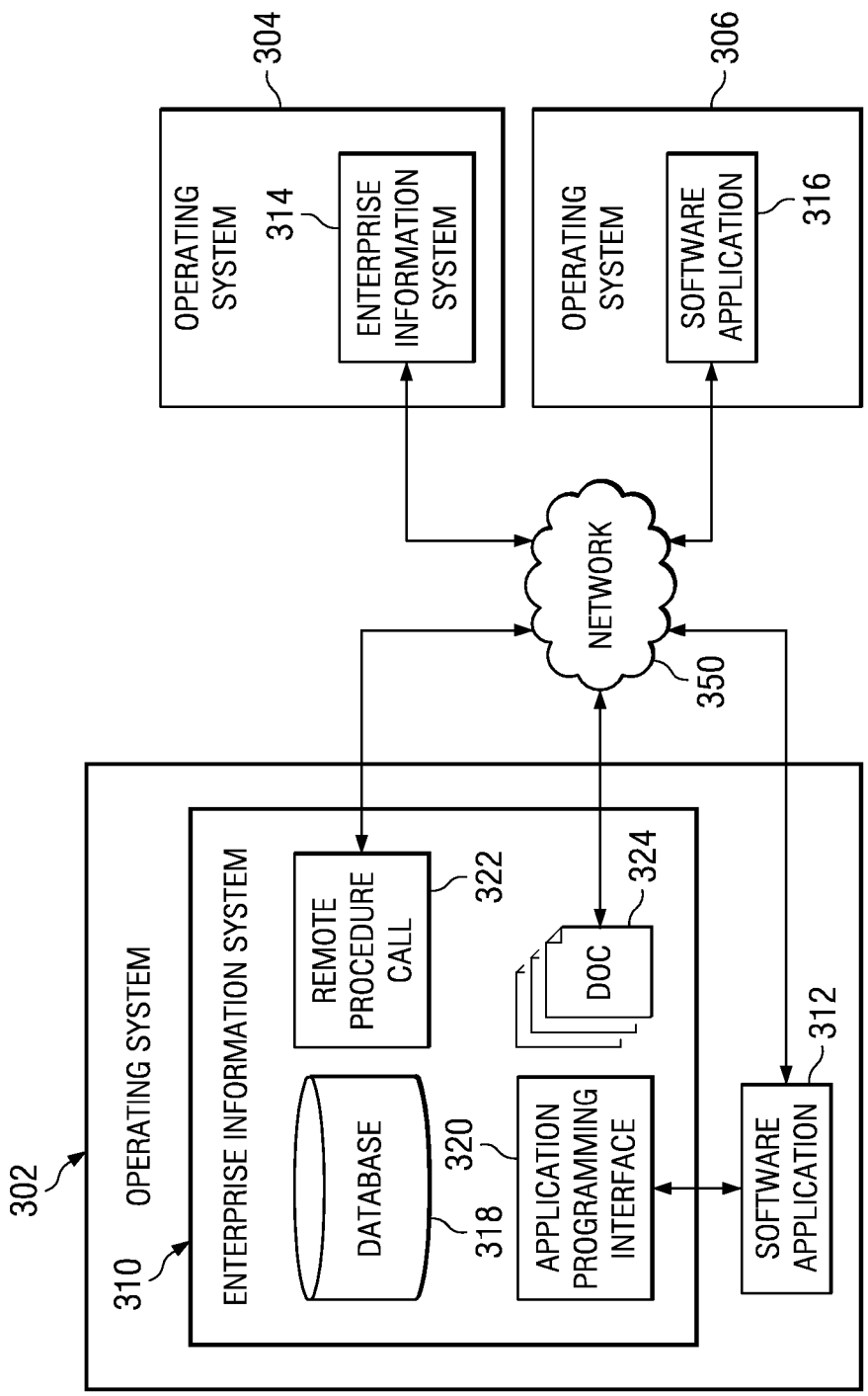
FIG. 3 depicts a block diagram of an enterprise information system integration in accordance with an illustrative embodiment.

With reference now to FIG. 3, a block diagram of an enterprise information system integration is depicted in accordance with an illustrative embodiment. Operating systems 302, 304, and 306 can each be an operating system running on a server, such as server 104 in FIG. 1, or on a client, such as client 114 in FIG. 1.

Enterprise information system 310 and software application 312 are depicted as running under operating system 302. Enterprise information system 314 is depicted as running under operating system 304. Another software application 316 is depicted as running under operating system 306. The arrangement and illustration of enterprise information system 314 and software applications 312 and 316 are only intended as one example and are not intended to be limiting on the manner in which other embodiments can be implemented. Enterprise information system 314 and software applications 312 and 316 are labeled as enterprise information system and software application respectively only as exemplary. An enterprise information system, a software application, or a device can be used in place of enterprise information system 314 or software applications 312 and 316 as a target application integrated with enterprise information system 310 without departing from the scope and spirit of the illustrative embodiments.

Enterprise information system 310 includes database 318 to manage the enterprise information system data. In these examples, database 318 may be, for example, a relational database, an object-oriented database, a flat file, an index file, or any other type of data storage suitable for managing enterprise information system data.

Enterprise information system 310 further includes application programming interface 320, remote procedure call 322 and document exchange interface 324, each of which may be used for communicating with the enterprise information system. For example, software application 312 may be an adapter that uses application programming interface 320 to communicate with enterprise information system 310.

Network 350 facilitates connectivity amongst the various enterprise information system and target applications. Note that enterprise information system 310, enterprise information system 314, and software application 316 are depicted as running on separate data processing systems under separate operating systems only as exemplary. This arrangement depicted in FIG. 3, however, is not intended to be limiting on the illustrative embodiment. One or more enterprise information system and software applications integrated with each other and running on a single data processing system are contemplated within the scope of the illustrative embodiments. Conversely, enterprise information system 310 and the depicted target applications can each run on distributed data processing system with multiple instances of operating systems servicing each enterprise information system and target application.

Figure 4:
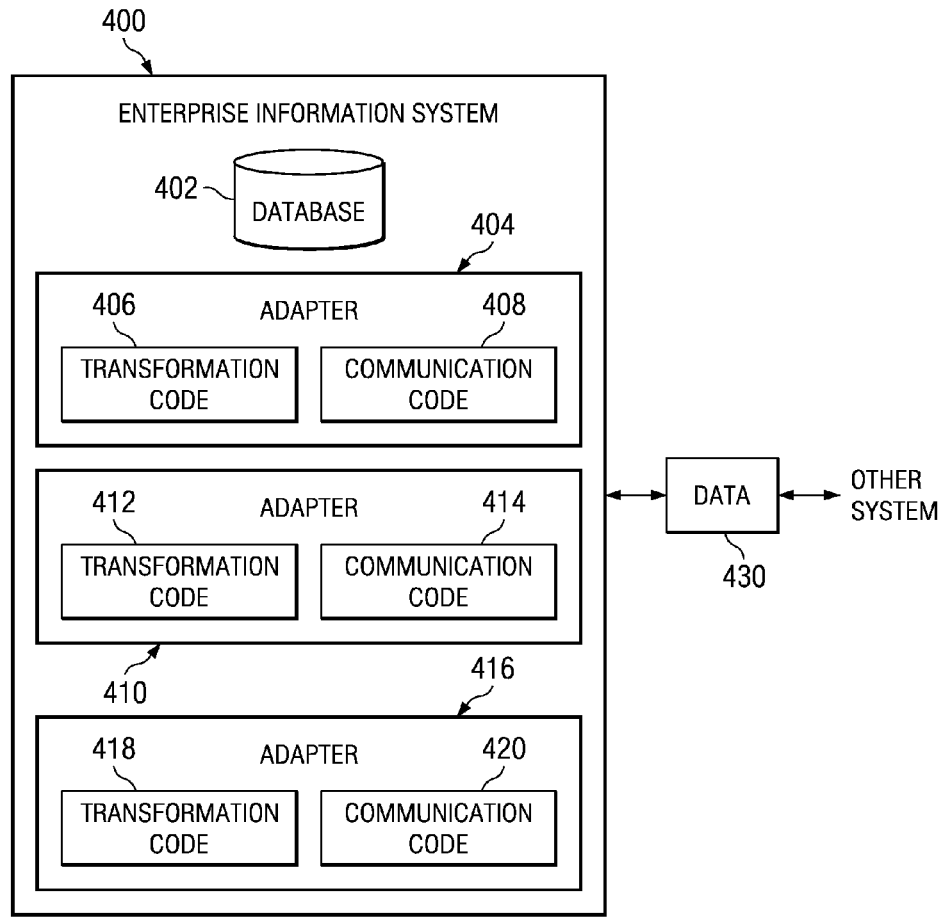
FIG. 4 depicts a block diagram of an enterprise information system in accordance with an illustrative embodiment.

With reference now to FIG. 4, a block diagram of an enterprise information system is depicted in accordance with an illustrative embodiment. Enterprise information system 400 can be implemented using enterprise information system 310 depicted in FIG. 3.

Enterprise information system 400 includes database 402, which may be implemented using database 318 in FIG. 3. Database 402 may be a relational database, an object-oriented database, a flat file, an index file, or any other type of data storage suitable for managing enterprise information system data.

Enterprise information system 400 further includes adapter 404 as described above. Adapter 404 is one of the several adapters possible in a typical enterprise information system.

Adapter 404 includes transformation code 406 for data transformation and communication code 408 for communicating with enterprise information system 400.

Adapter 410 similarly includes transformation code 412 for data transformation and communication code 414 for communicating with enterprise information system 400. Adapter 416 includes transformation code 418 for data transformation and communication code 420 for communicating with enterprise information system 400.

Enterprise information system 400 exchanges data 430 with other systems. Each transformation code 406, 412, and 418 may be designed for transforming to and from different data objects that form data 430. Alternatively, each transformation code 406, 412, and 418 may be designed for transforming to and from the same data object but using different methods of communicating using different communication codes 408, 414, and 420. Other combinations of transformation codes and communication codes are contemplated within the scope of the illustrative embodiments.

Figure 5:
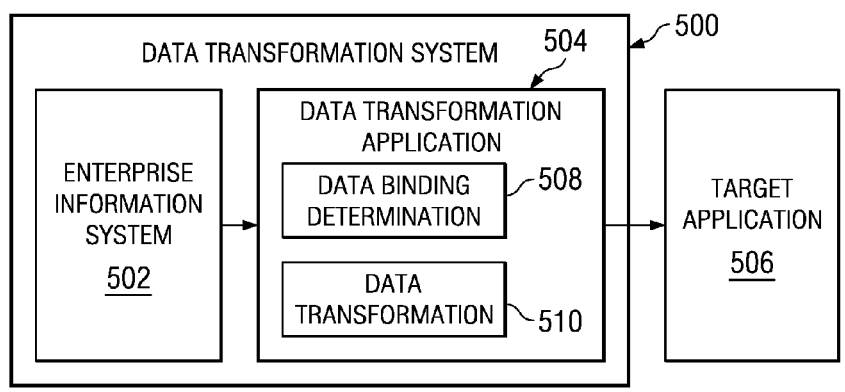
FIG. 5 depicts a block diagram of a data transformation system in accordance with an illustrative embodiment.

With reference now to FIG. 5, a block diagram of a data transformation system is depicted in accordance with an illustrative embodiment. Data transformation system 500 can run under an operating system such as operating system 302 in FIG. 3. In this depicted example, data transformation system 500 includes enterprise information system 502, which can be implemented using enterprise information system 310 in FIG. 3. Data transformation application 504 can be implemented as software application 312 in FIG. 3. Target application can be an enterprise information system, such as enterprise information system 314, or a software application, such as software application 316 in FIG. 3.

The process of data binding is the process of transforming data in a prescribed manner. A data binding component is a component manifested in hardware, software, or a combination thereof, which performs the process of data binding. A data binding component is also simply referred to as a data binding. A data binding may use other data bindings for data binding smaller portions of data or the entire data. A set of such other data bindings can exist. A set of data bindings is one or more data bindings.

Data transformation application 504 includes data binding determination 508, which is a component for determining the name of a data binding present inside the data transformation application. Data transformation 510 is a data transformation component responsible for transforming the data exchanged between enterprise information system 502 and target application 506.

The depiction in FIG. 5 is an exemplary depiction of the data transformation system and is not intended to be limiting on the illustrative embodiment. For example, enterprise information system 502 can be any system that exchanges data with another system. Furthermore, more than one system can be connected to either ends of data transformation application 504. Furthermore, enterprise information system 502 and data transformation application 504 may operate under different operating systems on different data processing systems. Other implementation configurations pertaining to the distribution of the various components shown is contemplated within the scope of the illustrative embodiment.

Figure 6:
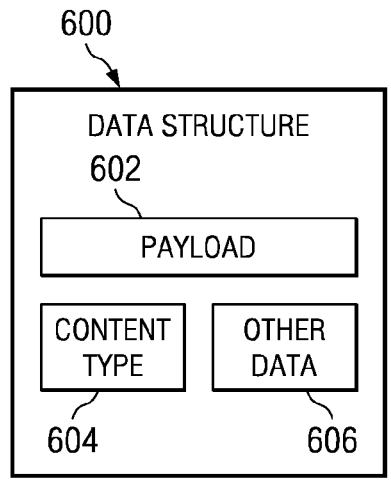
FIG. 6 depicts a block diagram of a data structure in accordance with an illustrative embodiment.

With reference now to FIG. 6, a block diagram of a data structure is depicted in accordance with an illustrative embodiment. Data structure 600 is an example of data 430 that may be transformed using adapter 404's transformation code 406 in FIG. 4.

Data structure 600 includes payload 602, which is the actual data that is the subject of the communication that uses data structure 600. Payload 602 can be, for example, the actual purchase order information including product, price, buyer, seller, shipping, and other relevant information.

Data structure 600 further includes content type 604 as described above. Content type 604 indicates to a system the classification or type of data contained in payload 602. A typical data structure may contain other pieces of information for a variety of purposes, such as for facilitating communication, and for maintaining integrity of data. Other data 606 represents these other pieces of information.

Figure 7:
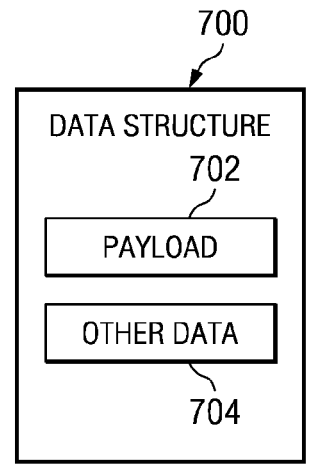
FIG. 7 depicts a block diagram of a second data structure in accordance with an illustrative embodiment.

With reference now to FIG. 7, a block diagram of a second data structure is depicted in accordance with an illustrative embodiment. Data structure 700 is another example of data 430 that may be transformed using adapter 404's transformation code 406 in FIG. 4.

Data structure 700 includes payload 702, which is the actual data that is the subject of the communication using data structure 700. Payload 702 can be, for example, the actual purchase order information including product, price, buyer, seller, shipping, and other relevant information.

Data structure 700 further includes other pieces of information for a variety of purposes, such as for facilitating communication, and for maintaining integrity of data. Other data 704 represents these other pieces of information.

Note that certain organizations of data, such as data structure 700, may not indicate a content type. Typically, such organizations of data are data objects already organized in some data structure. The data structure contains the information that can indicate to a system the nature of the data in payload 702. That is, payload 702 itself includes such indicative information.

Figure 8:
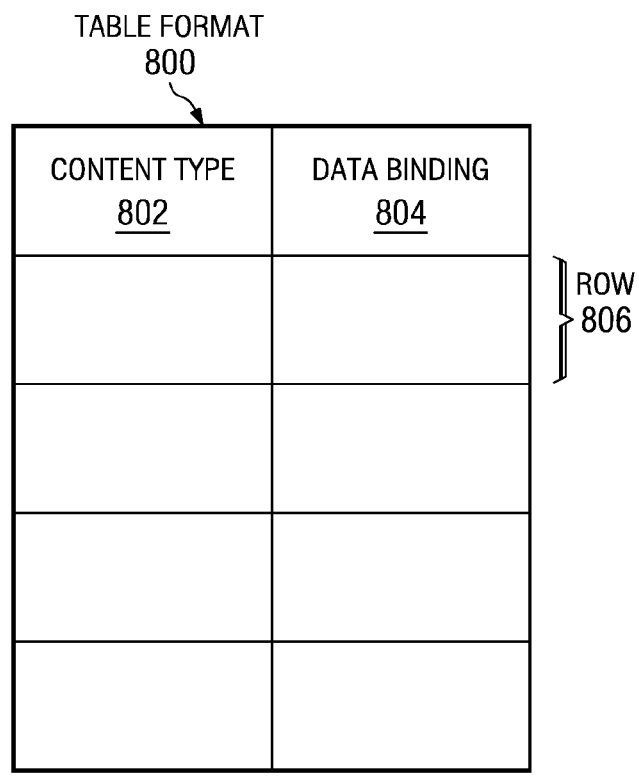
FIG. 8 depicts a table format correlating content type to object names in accordance with an illustrative embodiment.

With reference now to FIG. 8, a table format correlating content type to data binding is depicted in accordance with an illustrative embodiment. A table according to table format 800 is an exemplary implementation of the component for determining the data binding to use with the corresponding content type, namely, data binding determination 508 in FIG. 5. Data transformation application 504 in FIG. 5 can use the table for transforming a data identified by a content type to a data object with an object name, using the corresponding data binding.

Table format 800 includes column 802, which holds content type data in the rows under that column. Column 804 holds data binding data in the rows under that column. A row of a table according to table format 800, such as row 806, has an entry under each of the two columns 802 and 804. Given a content type, the data binding in the same row identifies the data binding to use with the data of that content type to transform the data into a data object. Similarly, given a data binding, a corresponding content type can be determined using table format 800.

Note that a table according to table format 800 is only an exemplary implementation for determining the data binding. Any other method of correlating content types with data binding is usable in the illustrative embodiments without departing from the scope and spirit of the illustrative embodiments. Two alternative implementations are described below that determine an object name without the use of the table described with respect to FIG. 8.

In certain implementations of the illustrative embodiment, a content type of a data may not be known. In such cases, the indication about a specific data transformation using a specific data binding may be specified in the data. For example, data structure 700 in FIG. 7 may include information about a content type in payload 702. An additional transformation can be applied to the data in such situations as follows—payload 702 may be transformed into a data object that may then reveal the content type. In this manner, when a content type is not provided, the content type may be discovered from the data.

Alternatively, in certain implementations of the illustrative embodiment, the content type may not be specified in the data, or be discoverable from the additional transformation as described above. In such implementations, the additional transformation can be applied to the data and the data can be simply transformed or reorganized into a data object of default object type and a default object name.

Figure 9:
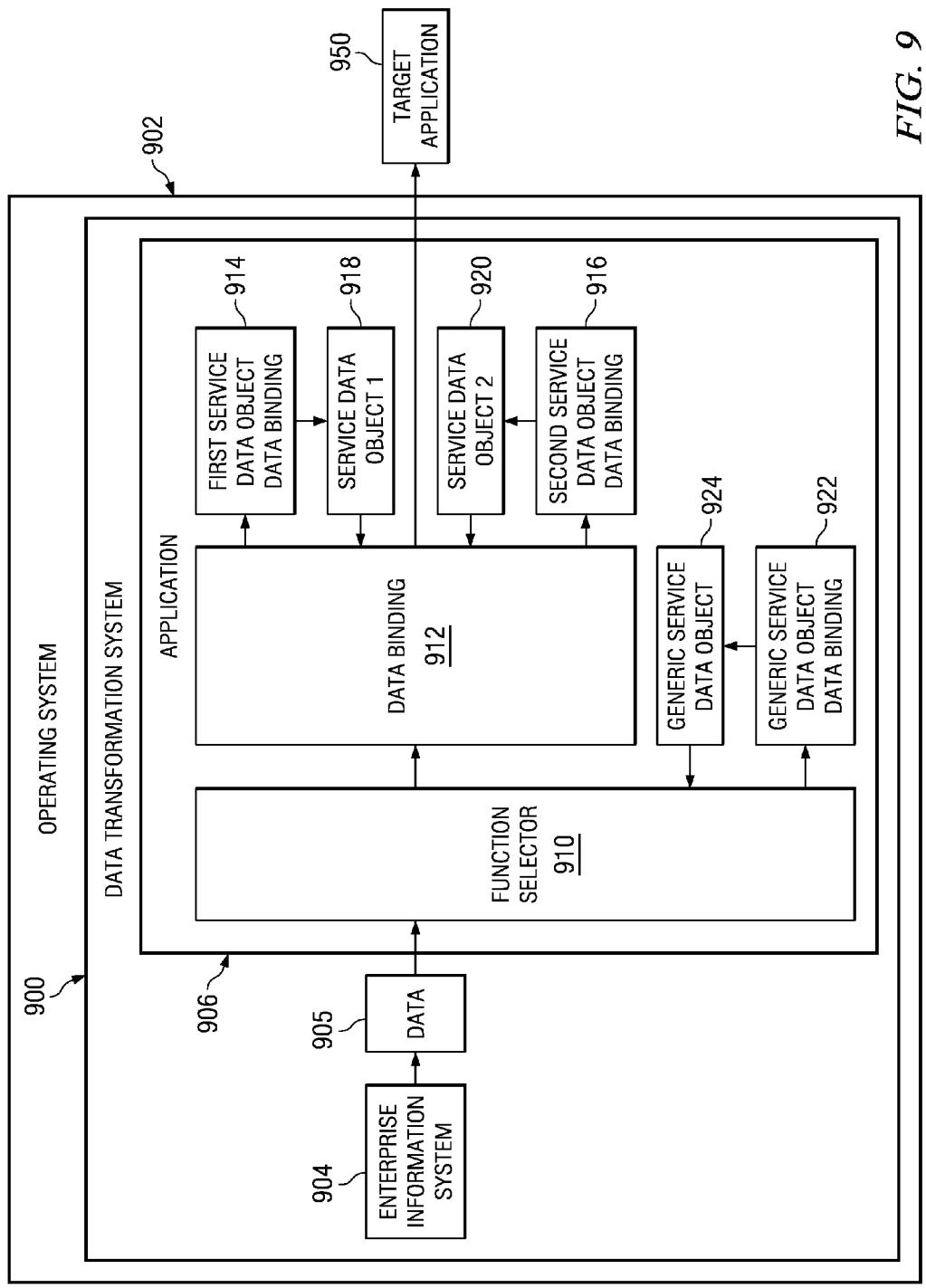
FIG. 9 depicts a block diagram for a data transformation system in accordance with an illustrative embodiment.

With reference now to FIG. 9, a block diagram for a data transformation system is shown in accordance with an illustrative embodiment. Data transformation system 900 is a more detailed illustration of data transformation system 500 in FIG. 5.

Data transformation system 900 runs under operating system 902 on a data processing system, such as server 104 or client 114 in FIG. 1.

Data transformation system 900 includes enterprise information system 904, which can be implemented using enterprise information system 502 in FIG. 5. Note that data transformation system 900 is depicted in relation to enterprise information system 904 only as exemplary. A software application, such as software application 316 in FIG. 3, may be used with data transformation system 900 in a similar manner.

Data transformation system 900 further includes application 906, which can be implemented using data transformation application 504 in FIG. 5. Data transformation system 900 receives data 905 from enterprise information system 904. Data 905 can be in the form of data structure 600 in FIG. 6 or data structure 700 in FIG. 7. Data 905 can also be in the form of a data object as described above.

Data transformation system 900 is described below in terms of transforming data flowing from an enterprise information system to a target application. However, the illustrative embodiment is similarly applicable to data flowing from a target application to an enterprise information system.

Application 906 includes function selector 910, and data binding component 912. Data binding component 914 performs a generic service data object (SDO) data binding. A service data object is a data object in the manner described above, that additionally conforms to a service component architecture (SCA) specification. Service component architecture is a software design architecture for making and using software components in a certain way.

Application 906 may include several other data binding components for performing data binding for specific forms of data. FIG. 9 further depicts data binding components 914 and 916 labeled first service data object data binding and second service data object data binding respectively. Data binding components 914 and 916 perform data bindings for creating specific first and second service data objects. The first and second service data objects can correspond to any data object in a given implementation.

In operation, function selector 910 receives data 905 from enterprise information system 904. Function selector attempts to determine a content type of the received data. Note that if data 905 is implemented as data structure 600 in FIG. 6, content type 604 in FIG. 6 will contain the content type information. In some cases, function selector 910 may utilize a transformation to transform the data into a default object and discover the content type from the default object.

Function selector 910 passes the data and the content type to data binding component 912. Data binding component 912 uses the content type to identify a data binding for converting the data to a data object. For example, data binding component 912 may use a table, such as table format 800 in FIG. 8, for this purpose.

Depending on the identified data binding, data binding component 912 may pass the data to another data binding component, for example to data binding component 914.

The selection of a specific data binding component, such as data binding component 914, by data binding 912, depends on the content type that is passed by function selector 910 to data binding component 912. In this exemplary operation, suppose that the content type passed by function selector 910 corresponds to a data binding provided by data binding component 914. Once a suitable data binding component, in this example data binding component 914, is selected, the data binding component transforms the data according to the data binding process provided in that data binding component.

Continuing with the above example, data binding component 914 generates a service data object that corresponds with the content type passed by function selector 910 and the data binding identified by data binding component 912. Service data object 918 is a service data object produced by data binding component 914 in accordance with the exemplary operation described above. Data binding component 916 and several other data binding components can be similarly used in a specific implementation of the illustrative embodiments. FIG. 9 depicts service data object 920 being produced as a result of data binding provided by data binding component 916. Each service data object produced in this manner has an object name associated with the service data object.

Returning to function selector 910, function selector 910 may receive data that does not include a content type. For example, the received data may be organized in the manner of data structure 600 in FIG. 6. If function selector 910 does not find a content type or object name associated with the received data, function selector 910 invokes generic service data object data binding component 922 with the data. Generic service data object data binding component 922 transforms the data into generic service data object 924. Generic service data object 924 also has an object name, which is a generic service data object name.

Function selector 910 then queries generic service data object 924 for a content type. Function selector 910 thus discovers the content type from generic service data object 924. Function selector 910 next passes generic service data object 924 and the discovered content type to data binding component 912. Data binding component 912 recognizes that the received data is already in a service data object form and does not perform further data binding on generic service data object 924.

Note that in some cases, function selector 910 may not be able to discover a content type from generic service data object 924. In such cases, function selector passes generic service data object 924 to data binding component 912. In these cases as well, data binding component 912 recognizes that the received data is already in a service data object form and does not perform further data binding on generic service data object 924.

Thus, data transformation system 900 arrives at a point in the operation where a service data object having an object name is available to data binding component 912. Data binding component 912 then routes the available service data object, such as service data object 918, 920 or 924, to their appropriate target applications, such as target application 950. The routing to a target application may be determined by using the service data object's name, or other target application identification method.

Note that the components of the data transformation system depicted in FIG. 9 are depicted and described only as exemplary in order to explain the illustrative embodiment. These components may be combined, separated, redefined, re-labeled, expanded, or contracted, to fit a particular implementation of the illustrative embodiment without departing from the scope and spirit of the illustrative embodiment.

Figure 10:
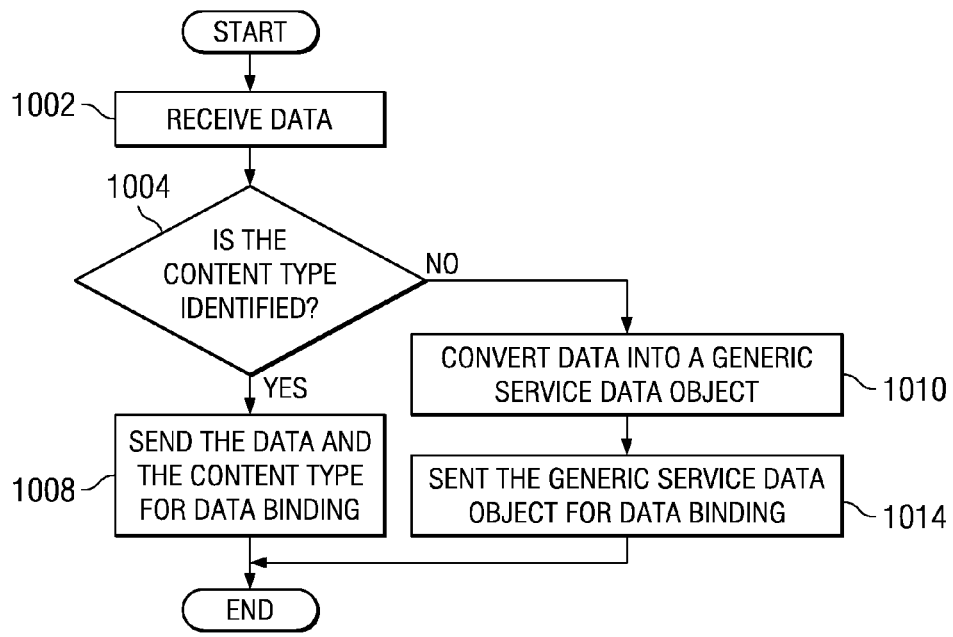
FIG. 10 depicts a flowchart of a function selector process in accordance with an illustrative embodiment.

With reference now to FIG. 10, a flowchart of a function selector process is depicted in accordance with an illustrative embodiment. The process of this figure can be implemented in function selector 910 in FIG. 9.

The process begins by receiving data (step 1002). The process then determines if a content type is identified in the received data (step 1004). Note that instead of, or in addition to the content type, an object name may be identified in the received data.

If a content type is identified in the received data ("yes" path of step 1004), the received data and the content type are sent for data binding (step 1008). The process ends thereafter.

Going back to step 1004, if the process determines that a content type is not identified in the received data ("no" path of step 1004), the process converts the received data into a generic service data object (step 1010). Having converted the received data into a generic service data object, the process uses the generic service data object's default name as the object name. In a specific implementation, the process may query the generic service data object for a content type if the implementation provides for specific content types in the generic service data object. The process then sends the generic service data object and the content type, if any, for data binding (step 1014). The process ends thereafter.

Figure 11:
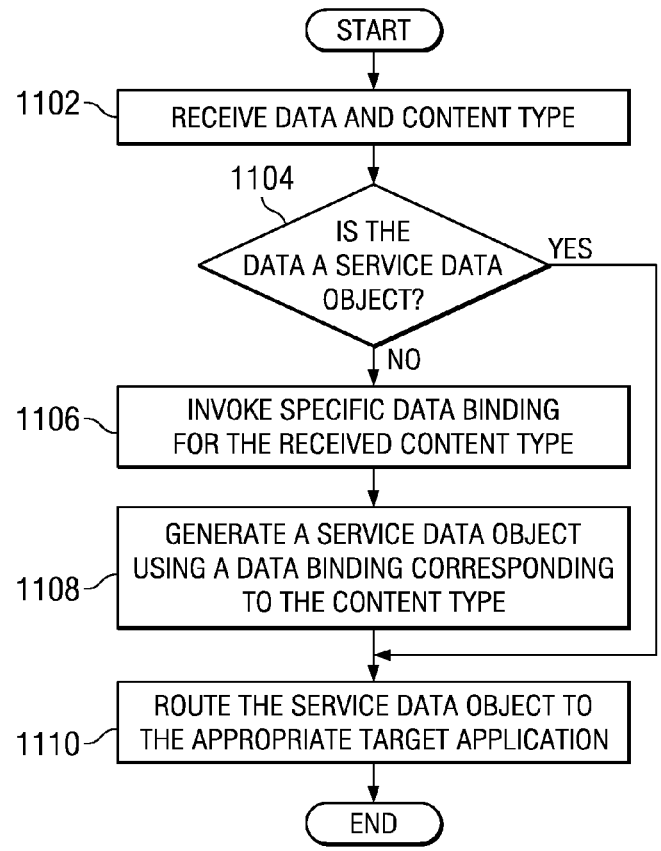
FIG. 11 depicts a flowchart of a data binding process in accordance with an illustrative embodiment.

With reference now to FIG. 11, a flowchart of a data binding process is depicted in accordance with an illustrative embodiment. The process of this figure can be implemented in data binding component 912 in FIG. 9.

The process begins by receiving data and content type (step 1102). The process then determines if the received data is a service data object (step 1104). If the received data is not a service data object ("no" path of step 1104), the process invokes a specific data binding according to the received content type (step 1106).

The process thus generates a service data object using a data binding corresponding to the received content type (step 1108). The service data object generated in this manner has an object name. Next, the process routes the service data object to the appropriate target application according to the received object name (step 1110). The process ends thereafter.

Going back to step 1104, if the received data is a service data object ("yes" path of step 1104), the process routes the service data object to the appropriate target application according to the received object name (step 1110). The process ends thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the illustrative embodiments provide a method, apparatus, and computer program code for exchanging data using data transformation. The illustrative embodiments remove the drawbacks of traditional enterprise information system adapters identified above. A data binding infrastructure is provided within which several levels of data binding can be implemented for facilitating data exchange between two or more systems. Data received from a source system is transformed using one or more of the data bindings and routed to a target system according to the name of the transformed data object. New data bindings can be used for delegating the transformation of new forms of data without affecting the remainder of the data binding infrastructure.

Additionally, presently available adapter based solutions are proprietary and difficult to change with evolving technologies. The illustrative embodiments describe an infrastructure that can be built using standards such as Java Connector Architecture (JCA), Service Data Object (SDO), and Enterprise Metadata Delivery (EMD).

In a specific implementation, the IBM® WebSphere® Application Server manufactured by International Business Machines was used for implementing the illustrative embodiments. The illustrative embodiments were implemented using the Enterprise Metadata Discovery (EMD) open standard framework from BEA and IBM. The service implementation was based on Service Component Architecture (SCA) for defining the enterprise information system data imports and exports. (IBM and WebSphere are registered trademarks of International Business Machines Corporation in the United States, other countries, or both).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times, code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus, comprising at least one processor, for data transformation, the apparatus comprising:
    a function selector, wherein the function selector identifies a content type associated with data to form an identified content type;
    a first data binding component, wherein the first data binding component receives the data and the identified content type from the function selector; and
    a set of data bindings, wherein each data binding in the set of data bindings is associated with a corresponding content type, wherein a data binding from the set of data bindings corresponding to the identified content type is invoked by the first data binding component to transform the data into a data object having an object name,
    wherein the first data binding component routes the data object to a target application, and wherein the target application is determined based on the object name.

2. The apparatus of claim 1, wherein the function selector determines the content type associated with the data by transforming the data into a generic data object and discovering the content type from the generic data object.

3. The apparatus of claim 2, further comprising:
    a generic data binding component, wherein the function selector invokes the generic data binding component, and the generic data binding component transforms the data into the generic data object.

4. The apparatus of claim 1, wherein if a content type is not associated with the data, the function selector transforms the data into a generic data object, and the first data binding component sets the object name to be a generic object name.

5. The apparatus of claim 4, wherein responsive to receiving the generic data object from the function selector, the first data binding component omits invoking a data binding from the set of data bindings.

6. A computer implemented method for data transformation comprising:
    responsive to receiving data in a function selector, determining a content type associated with the data to form an identified content type;
    sending the data and the identified content type to a first data binding component;
    invoking a data binding corresponding to the identified content type from a set of data bindings to transform the data into a data object, the data object having an object name; and
    routing the data object to a target application, wherein the target application is determined based on the object name.

7. The computer implemented method of claim 6, wherein the content type associated with the data is determined by transforming the data into a generic data object and discovering the content type from the generic data object.

8. The computer implemented method of claim 7, wherein the transforming the data into a generic data object is done by invoking a generic data binding component and the generic data binding component transforming the data into the generic data object.

9. The computer implemented method of claim 6, wherein if a content type is not associated with the data, transforming the data into a generic data object and setting the object name to be a generic object name.

10. The computer implemented method of claim 9, wherein responsive to receiving the generic data object from the function selector, omitting invoking the data binding from the set of data bindings.

11. A computer usable program product comprising a computer readable storage device including computer usable code for data transformation, the computer usable program product comprising:
    computer usable code for, responsive to receiving data in a function selector, determining a content type associated with the data to form an identified content type;
    computer usable code for sending the data and the identified content type to a first data binding component;
    computer usable code for invoking a data binding corresponding to the identified content type from a set of data bindings to transform the data into a data object, the data object having an object name; and
    computer usable code for routing the data object to a target application, wherein the target application is determined based on the object name.

12. The computer usable program product of claim 11, further comprising: computer usable code for transforming the data into a generic data object; and computer usable code for discovering the content type from the generic data object.

13. The computer usable program product of claim 11, wherein if a content type is not associated with the data, the computer implemented method further comprising: computer usable code for transforming the data into a generic data object; and computer usable code for setting the object name to be a generic object name.

14. The computer usable program product of claim 13, further comprising: computer usable code for, responsive to receiving the generic data object from the function selector, omitting invoking the data binding from the set of data bindings.

15. A data processing system for data transformation, the data processing system comprising:
    a storage device, wherein the storage device stores computer usable program code; and
    a processor, wherein the processor executes the computer usable program code, and wherein the computer usable program code comprises:
    computer usable code for, responsive to receiving data in a function selector, determining a content type associated with the data to form an identified content type;
    computer usable code for sending the data and the identified content type to a first data binding component;

computer usable code for invoking a data binding corresponding to the identified content type from a set of data bindings to transform the data into a data object, the data object having an object name; and computer usable code for routing the data object to a target application, wherein the target application is determined based on the object name.

16. The data processing system of claim 15, further comprising: computer usable code for transforming the data into a generic data object; and computer usable code for discovering the content type from the generic data object.

17. The data processing system of claim 15, wherein if a content type is not associated with the data, the computer usable code further comprises: computer usable code for transforming the data into a generic data object; and computer usable code for setting the object name to be a generic object name.

18. The data processing system of claim 17, further comprising:

computer usable code for, responsive to receiving the generic data object from the function selector, omitting invoking the data binding from the set of data bindings.

* * * * *